United States Patent [19]

Taniguchi et al.

[11] 4,019,025
[45] Apr. 19, 1977

[54] CARD CONVEYOR DEVICE

[75] Inventors: Tadasu Taniguchi, Tokyo; Iwao Hosaka; Shigehiro Kato, both of Chichibu, all of Japan

[73] Assignees: Canon Kabushiki Kaisha, Tokyo; Canon Denshi Kabushiki Kaisha, Saitama, both of Japan

[22] Filed: Sept. 5, 1975

[21] Appl. No.: 610,875

[30] Foreign Application Priority Data

Sept. 9, 1974 Japan .............................. 49-103701

[52] U.S. Cl. .......................... 235/61.11 R; 271/273
[51] Int. Cl.² .................... G06K 13/02; G06K 7/10
[58] Field of Search ............. 235/61.11 R; 271/273, 271/274, DIG. 9, 3

[56] References Cited

UNITED STATES PATENTS

| | | | |
|---|---|---|---|
| 3,430,947 | 3/1969 | Davis, Jr. | 271/274 |
| 3,527,406 | 9/1970 | Snellman | 235/61.11 R |
| 3,532,338 | 10/1970 | Brinson et al. | 271/273 |
| 3,896,291 | 7/1975 | Wiedeman | 235/61.11 R |

Primary Examiner—Vincent P. Canney
Attorney, Agent, or Firm—Fitzpatrick, Cella, Harper & Scinto

[57] ABSTRACT

A card conveyor device comprises a card guide path the transport means being spaced by a distance less than the length of the card, along which a card for reading or writing information therein is guided in a predetermined direction, first and second transport means adapted to engage the card to thereby move the same along the card guide path, drive means for the card transport means, detector means for detecting the position of the card on the guide path, and control means effective to bring the card transport means into or out of engagement with the card as determined by a signal from the detector means.

55 Claims, 30 Drawing Figures

CARD CONVEYOR DEVICE

BACKGROUND OF THE INVENTION

1. Field of the Invention

This invention relates to a card conveyor device, and more particularly to a card conveyor device suitable for use with a card reader which effects reading of information from a card having a magnetic track, writing of information into the card and check-up of the information written in the card.

2. Description of the Prior Art

In the banking service, and especially in the ordinary deposit handling service, attempts for the automation of the refundment work by the introduction of a computer have recently been made for the purpose of manpower saving and quick business transaction and such automation has partly been put into practice. With such a system, the depositors are given magnetic cards in which necessary information is magnetically recorded and they can apply such magnetic cards to a console unit or card reader installed in the bank to input a predetermined invisible code number and thereby obtain necessary refundment from their deposits.

Such system is convenient on the one hand, while on the other hand it is not free of the fear that deposits might be refunded to the wrong person by the use of found cards. More specifically, when a card is applied to the card reader which is a console unit, the identification of the bearer of the card with the true possessor of the card has so far been done with the aid of a four-digit invisible code number which is known only to the true possessor of the card, and the invisible code number in question is always included among ten thousand combinations of four digits from 0000 to 9999. Thus, even if the invisible code number of the found card is unknown to the bearer of the card, he will be able to gain unjust refundment of the deposit by trying ten thousand times at most.

To prevent such injustice, there has been introduced a system whereby, when wrong invisible code numbers have been input up to three times, a signal representing such fact is written in the card and the card is temporarily returned to the person who entered the wrong numbers and if further three wrong invisible code numbers have been entered, a signal for nullifying the card is written in the card to thereby make it impossible to withdraw money from the deposit by the use of that card.

The card reader used as the console unit in the described system must of course be provided with two functions of reading and writing and further, when a wrong invisible code number has been input, must be capable of performing a function of writing in the card a signal representative of the fact that a wrong input has been entered.

The countermeasures heretofore taken in the conventional card readers to meet these requirements will hereinafter be considered by reference to some of the accompanying drawings.

Figure 1A:
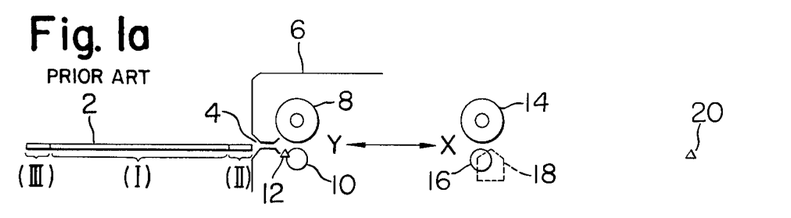
FIGS. 1a–i illustrate the principle of the card conveyor device used with the conventional card reader.
Figure 1B:
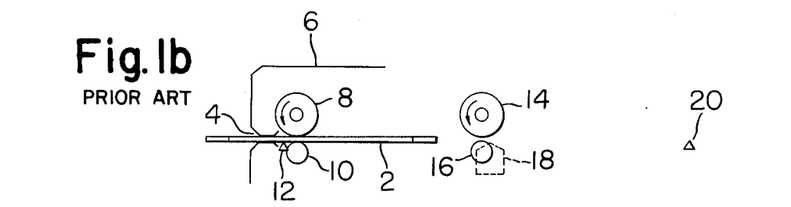
Figure 1C:
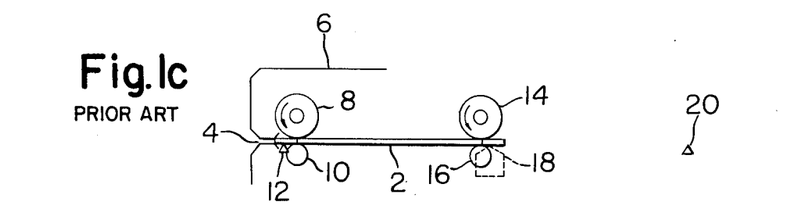
Figure 1D:
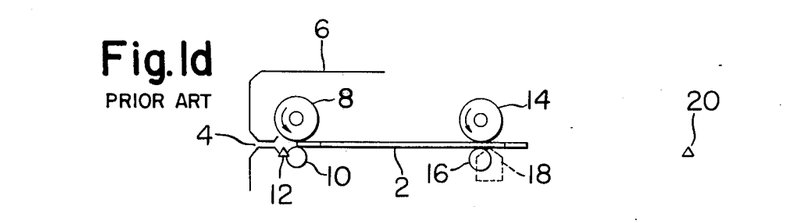
Figure 1E:
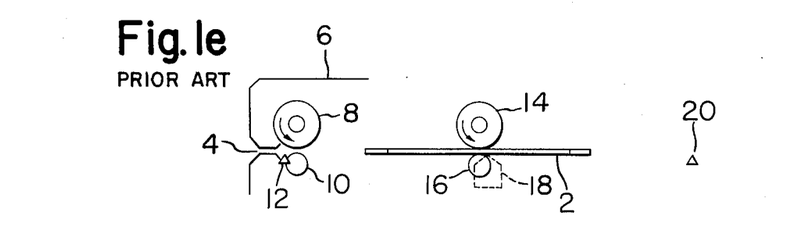
Figure 1F:
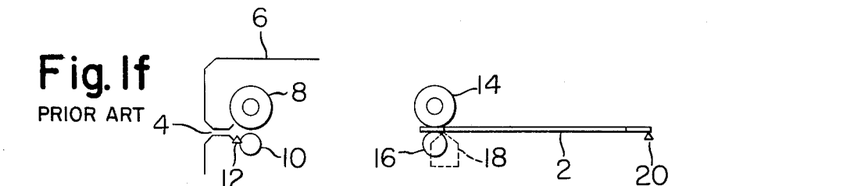
Figure 1G:
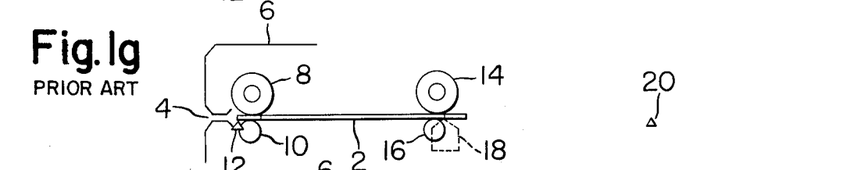
Figure 1H:
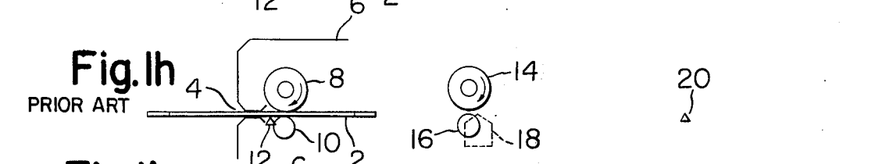
Figure 1I:
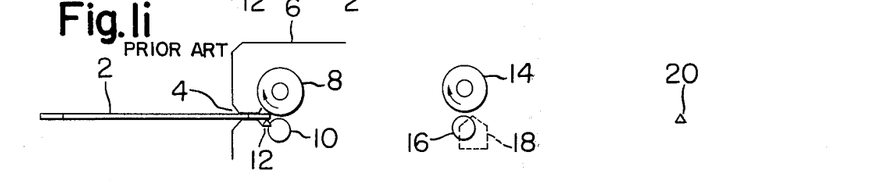
Figure 2A:
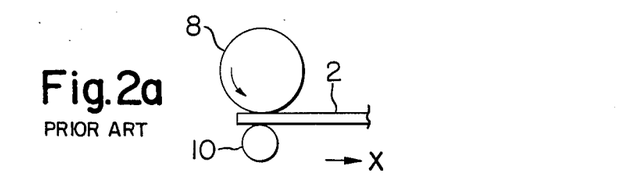
Figure 2B:
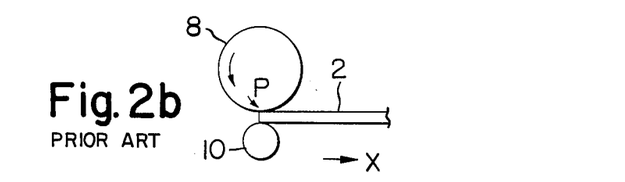
Figure 2C:
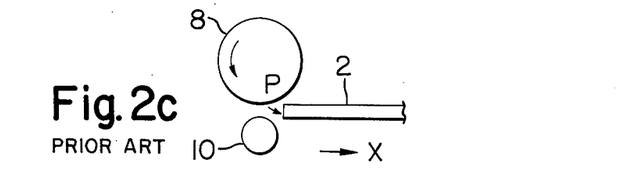
Figure 3A:
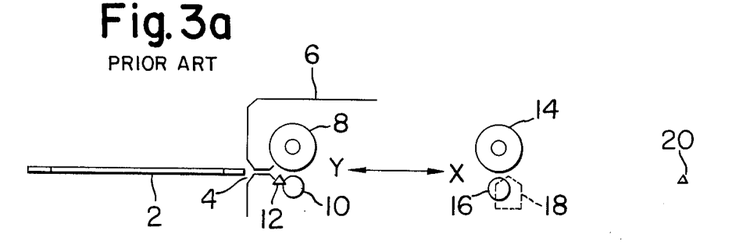
FIGS. 3a–d are schematic side views of the card conveyor device according to the prior art.
Figure 3B:
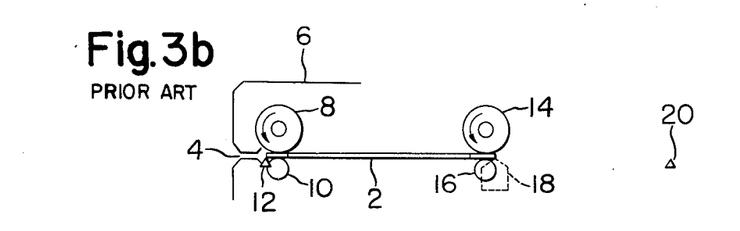
Figure 3C:
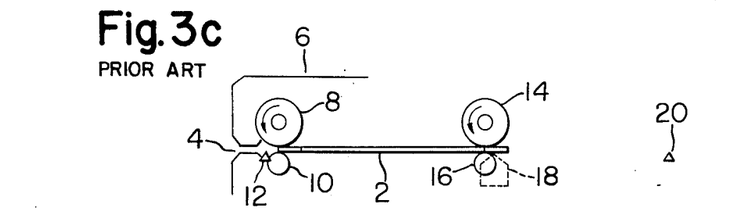
Figure 3D:
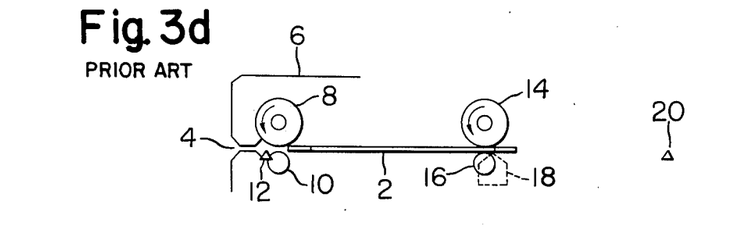

In the drawings,

FIGS. 1a–i illustrate the principle of the card conveyor device in the conventional card reader, FIGS. 2a–c partly illustrate the operation of the card conveyor device of FIG. 1, and FIGS. 3a–d are schematic side views of the card conveyor device according to the prior art.

In the construction shown in FIG. 1, there is a magnetic card 2 having a data area (I) carrying therein magnetically written data and a blank end area (II), an inlet port 4 for inserting therethrough the magnetic card 2 into a card reader body 6, a first transport roller 8 for transporting the magnetic card 2 in the direction of arrow X or arrow Y, a first roller 10 rotatably mounted in opposed relationship with the first transport roller to hold and urge the magnetic card 2 against the first transport roller 8, a first sensor 12 for detecting the insertion and discharge of the magnetic card 2 through the inlet port 4, a second transport roller 14 for transporting the magnetic card 2 in the direction of arrow X or arrow Y, a second roller 16 rotatably mounted in opposed relationship with the second transport roller 14 to hold and urge the magnetic card 2 against the second transport roller 14, a magnetic head 18 for reading the data in the data area (I) of the magnetic card 2 transported in the direction of arrow X or Y by the first 8 or the second transport roller 14 or for writing data in the data area (I) at any desired location thereof, and a second sensor 20 for detecting that the magnetic card 2 as transported by the second transport roller 14 in the direction of arrow X has come to a position in which the data area (I) of the magnetic card is out of the corresponding relationship with the magnetic head 18. Incidentally, the sensor 12 has, in addition to the above-described function, a function of detecting that the magnetic card 2 as transported by the second 14 and the first transport roller 8 in the direction of arrow y has come to a position in which the data area (I) of the magnetic card is out of the corresponding relationship with the magnetic head 18.

In the construction described above, when the magnetic card 2 is inserted through the inlet port 4 from the position of FIG. 1a, the first sensor 12 detects this and the first and second transport rollers 8 and 14 begin to rotate counter-clockwise, as viewed in the figure. As the magnetic card 2 is inserted further, the leading end edge of the card is nipped by and between the first transport roller 8 and the first roller 10 so that the card is transported in the direction of arrow X (FIG. 1b). As the magnetic card 2 is further transported in the direction of arrow X, the leading end edge of the card is now nipped by and between the second transport roller 14 and the second roller 16 (FIG. 1c), so that the card is transported by both of the first 8 and the second transport roller 14. Subsequently, the data area (I) of the magnetic card 2 comes to face and bear against the magnetic head 18, whereupon reading of the data on the card is initiated. As the magnetic card 2 is further transported, the trailing end edge of the card leaves the first transport roller 8 (FIG. 1d) so that the card is now transported only by the second transport roller 14 in the direction of arrow X (FIG. 1e). In the meantime, the data in the data area (I) of the magnetic card 2 is continuously read out by the magnetic head 18. Through the described operation, the reading of the data is terminated with the data area (I) of the magnetic card 2 coming out of the face-to-face contact with the magnetic head 18, whereupon this is detected by the second sensor 20 to stop the counter-clockwise rotation of the first and second transport rollers 8 and 14 and thus stop the transport of the magnetic card 2 in the direction of arrow X (FIG. 1f). The position of the magnetic card when this occurs is a first position. Subsequently, the first and second transport rollers 8 and 14 start to rotate in clockwise direction to thereby transport the magnetic card now in the direction of arrow Y. In this manner, the magnetic card 2 comes back to a position in which the then trailing end of the data area (I) corresponds to the magnetic head 18, whereupon this is detected by the first sensor 12 to stop the clockwise rotation of the first and second transport rollers 8 and 14 are accordingly the transport of the magnetic card 2 in the direction of arrow Y (FIG. 1g). The position of the magnetic card 2 when this occurs is a second position. In such second position, the magnetic card 2 cannot be withdrawn out of the card inlet port 4 by any means. With the magnetic card in this position, the depositor may input his invisible code number through a key input device, now shown. If a right invisible code number is input and withdrawl of money from the deposit accomplished, the first and second transport rollers will begin to rotate clockwise to transport the magnetic card 2 in the direction of arrow Y (FIG. 1h), thereby discharging the magnetic card 2 out of the body 6 through the inlet port 4 (FIG. 1i). However, if the invisible code number entered is wrong, the magnetic card 2 will be held in the second position to wait for entry of a new invisible code number. If wrong code numbers were entered three times, the first and second transport rollers 8 and 14 would be rotated counter-clockwise to transport the magnetic card 2 in the direction of arrow X (FIG. 1d, e and f), so that data representing the fact that three wrong code numbers were input will be written in the data area (I) of the card at a predetermined location thereof by the magnetic head 18, whereafter the first and second transport rollers 8 and 14 will be rotated clockwise to discharge the magnetic card 2 through the inlet port 4 (FIGS. 1f, g, h and i).

In the above-described construction, even once the data on the magnetic card 2 has been read, the magnetic card 2 cannot be removed from the body 6 unless the depositor thereafter enters right invisible code number or enters wrong invisible code numbers three times and the data representing such fact is written in the magnetic card 2, and accordingly, this construction is provided with two transport rollers, namely, the first transport roller 8 for introducing the magnetic card 2 into the body 6 and the second transport roller 14 for transporting the magnetic card 2 between the first and the second position.

In such construction, however, the two transport rollers each have a flexible circumferential portion of rubber or like material adapted to be resiliently urged against the magnetic card to transport the same and therefore, when the magnetic card 2 is being transported while being nipped between the first transport roller 8 and the first roller 10, as shown in FIGS. 1a, b, and c, the first transport roller 8 is resiliently deformed so that the magnetic card 2 undergoes a pressure force in the direction of arrow P at the moment it leaves the first transport roller 8, and thus the magnetic card 2 is momentarily transported at a high speed in the direction of arrow X. In the construction shown in FIG. 1, wherein reading or writing of data is started with the magnetic head 18 facing and bearing against the data area (I) of the magnetic card 2 as it is transported in the direction of arrow X by both of the first 8 and the second transport roller 14 (FIG. 1c) and thereafter, the card 2 is further transported in the direction of arrow X so that the trailing end edge of the card leaves the first transport roller 8 (FIG. 1d and the card 2 shifts into a condition in which it is transported in the direction of arrow X only by the second transport roller 14, the above-described momentarily rapid transport of the magnetic card 2 occurring during the said shift of the card may cause a possibility of erroneous reading or erroneous writing.

To overcome such inconvenience, use has heretofore been made of a magnetic card conveyor device which is designed as shown in FIG. 3, wherein the distance between the first transport roller 8 and the second transport roller 14 is greater so that, when the magnetic card 2 is being transported in the direction of arrow X by both of the counter-clockwisely rotating first and second transport rollers 8 and 14 (FIG. 3b) and when the magnetic card 2 further transported in the direction of arrow X has come to the position where the trailing end edge of the card leaves the first transport roller 8 (FIG. 3c), the data area (I) of the card does not face and bear against the magnetic head and that such data area (I) faces and bears against the magnetic head 18 only when and after the card comes to be transported only by the second transport roller 14 (FIG. 3d), whereupon reading or writing of data starts and thereby, it is ensured that the data area (I) of the magnetic card 2 face and bear against the magnetic head 18 only after the trailing end edge of the card leaves the first transport roller 8 so that the card is transported in the direction of arrow X only by the second transport roller 14, thus to prevent any erroneous reading or writing which may result from the momentary variation in the movement velocity of the card at the moment when the trailing end edge of the card leaves the first transport roller 8.

In such construction, however, the need for the greater distance between the first and the second transport roller has limited the size reduction of the device and this has formed a serious problem when it has been desired to accommodate the card conveyor device within a limited space.

SUMMARY OF THE INVENTION

It is an object of the present invention to eliminate the above-noted disadvantages existing in the prior art and to provide a card conveyor device which is small in size and capable of performing card transport at a stable velocity.

It is another object of the present invention to provide a novel card conveyor device which reduces the variation in card transport velocity at the moment when the trailing end edge of the card leaves the first roller.

The invention will become fully apparent from the following detailed description thereof taken in conjunction with the accompanying drawings.

BRIEF DESCRIPTION OF THE DRAWINGS

FIGS. 21–c partly illustrate the operation of the card conveyor device shown in FIG. 1.

DESCRIPTION OF THE PREFERRED EMBODIMENTS

The principle of the present invention will first be described, and then the general construction of the card conveyor device according to the present invention will be clarified.

Referring to FIG. 4 which are schematic side views for illustrating the basic operational principle of the card conveyor device according to the present invention, reference numeral 22 designates a third sensor for detecting that the magnetic card 2 transported in the direction of arrow X by the first transport roller 8 has come to be nipped by and between the second transport roller 14 and the second roller 16 and ready for transport in the direction of arrow X, and numeral 24 designates the arm of an electromagnetic solenoid 26 for holding the first transport roller 8. The other numerals designate members similar to those previously described with respect to the prior art.

Figure 4A:
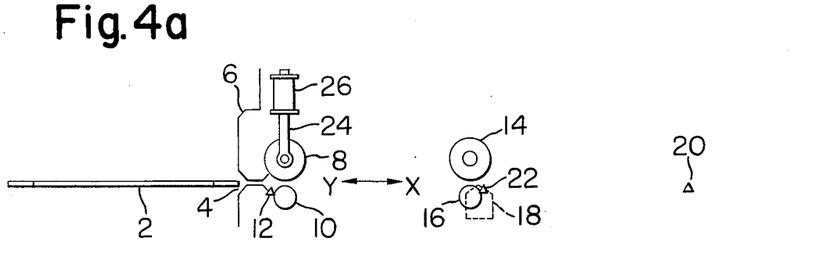
FIGS. 4a–i are schematic side views for illustrating the principle of the present invention.
Figure 4B:
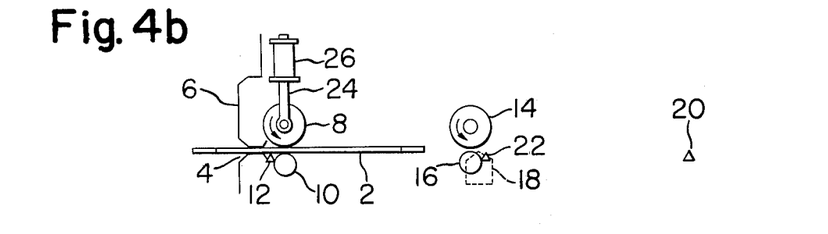
Figure 4C:
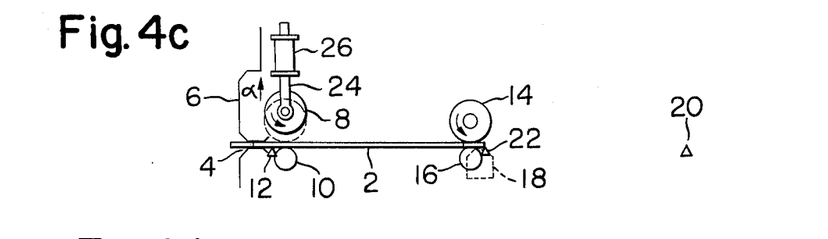
Figure 4D:
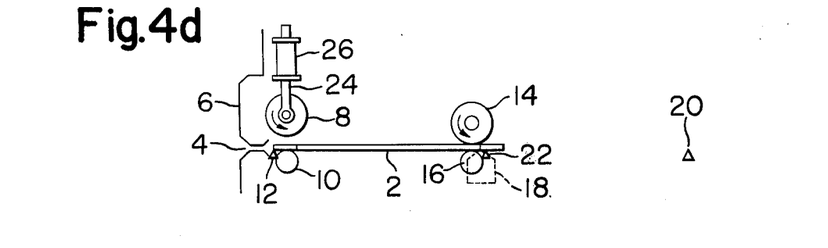
Figure 4E:
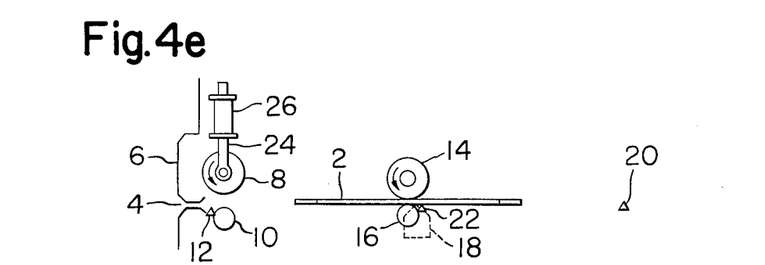
Figure 4F:
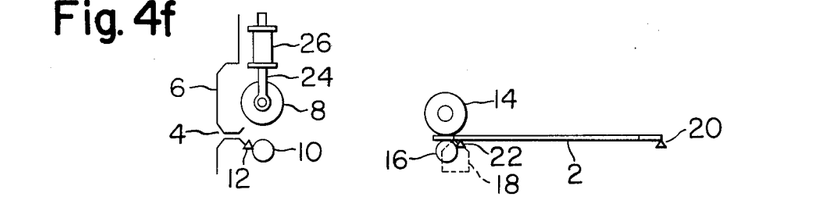
Figure 4G:
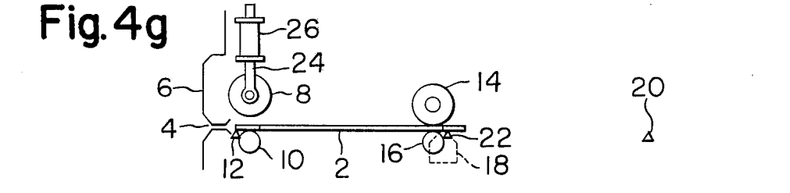
Figure 4H:
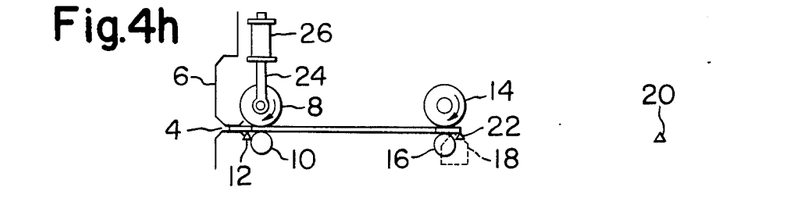
Figure 4I:
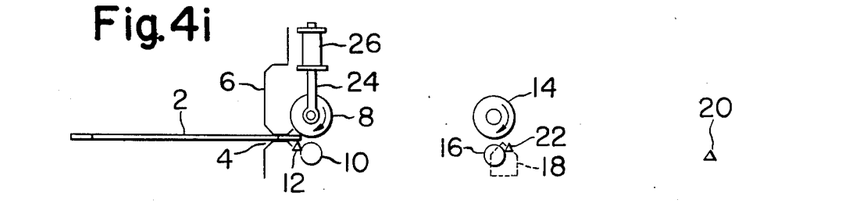

In this construction, when the magnetic card 2 is inserted from the position of FIG. 4(a), the first sensor 12 detects such insertion and the first 8 and the second transport roller 14 start to rotate counter-clockwise. As the magnetic card 2 is further inserted, the leading end edge of the card is nipped by and between the first transport roller 8 and the second roller 10 and transported thereby in the direction of arrow X (FIG. 4b). As the magnetic card 2 is further transported in the direction of arrow X, the leading end edge of the card is nipped by and between the second transport roller 14 and the second roller 16 and immediately thereafter, this is detected by the third sensor 22. By the detection signal thereof, the electromagnetic solenoid 26 is energized to drive the arm 24 in the direction of arrow, (FIG. 4(c)) so that the first transport roller 8 is disengaged from the magnetic card 2. Subsequently, the trailing edge of the card 2 leaves the first sensor 12 and the first sensor 12 detects that the data area (I) of the magnetic card 2 has come to face and bear against the magnetic head 18, whereupon data reading is initiated as the card is transported in the direction of arrow X (FIG. 4(d)). Thereafter, the magnetic card 2 is further transported in the direction of arrow X by the second transport roller 14 and in the meantime, the data in the data area (I) of the magnetic card 2 is continuously read by the magnetic head 18 (FIG. 4(e)). Through the operation previously described, the data reading is completed with the data area (I) of the magnetic card 2 now being off the magnetic head 18, and this is detected by the second sensor 20 to stop the counter-clockwise rotation of the first and second transport rollers 8 and 14 and stop the card in its first position (FIG. 4(f)). Subsequently, the first and second transport rollers 8 and 14 start to rotate clockwise to thereby transport the magnetic card 2 in the direction of arrow Y. In this manner the magnetic card 2 comes to a position in which the then trailing end of the data area (I) corresponds to the magnetic head 18, when the then leading end edge of the card 2 reaches the first sensor 12, and this is detected by the sensor 12 to stop the clockwise rotation of the first and second transport rollers 8 and 14 and thus stop the card in its second position (FIG. 4(g)). In the second position, the magnetic card 2 cannot be withdrawn out of the card inlet port 4 by any means, as already noted. With the card in such position, the depositor may input his invisible code number through a key input device, not shown, and if the invisible code number is right and withdrawal of money from the deposit is accomplished, the first 8 and the second transport roller 14 will begin to rotate clockwise and the magnetic card 2 will be transported by the second transport roller in the direction of arrow Y, until just before the card is liberated from the nip between the second transport roller 14 and the second roller 16, whereupon the electromagnetic solenoic so far energized will be deenergized to permit the first transport roller 8 to be urged against the magnetic card 2 (FIG. 4(h)), so that even after the then trailing end edge of the card has left the second transport roller 14, the magnetic card 2 will continue to be transported in the direction of arrow Y by the first transport roller 8 for discharge out of the body 6 through the inlet port 4 (FIG. 4(i)).

If wrong invisible code numbers were entered three times, the magnetic card 2 will be again transported from its second position to its first position, as in the prior art device, and recorded with a data representing the presence of the wrong input, whereafter the magnetic card 2 would be discharged through the inlet port 4 in the sequence as already described.

Description will now be made of the card conveyor device using the principle of the present invention which has hitherto been described in detail.

Figure 5:
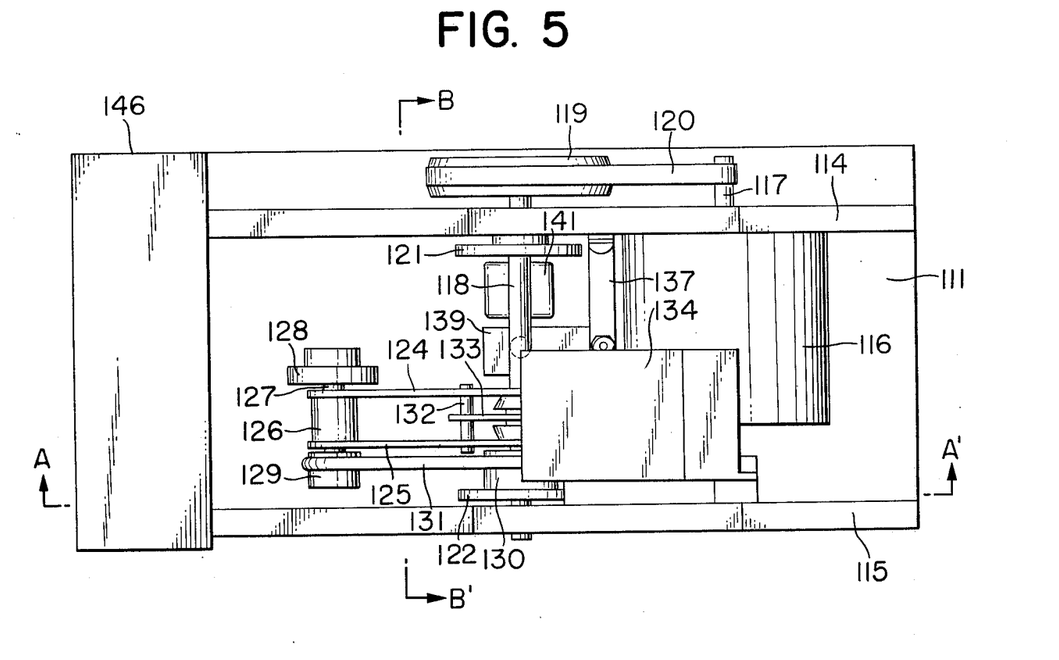
FIG. 5 is a top plan view of the card conveyor device according to the present invention.
Figure 6:
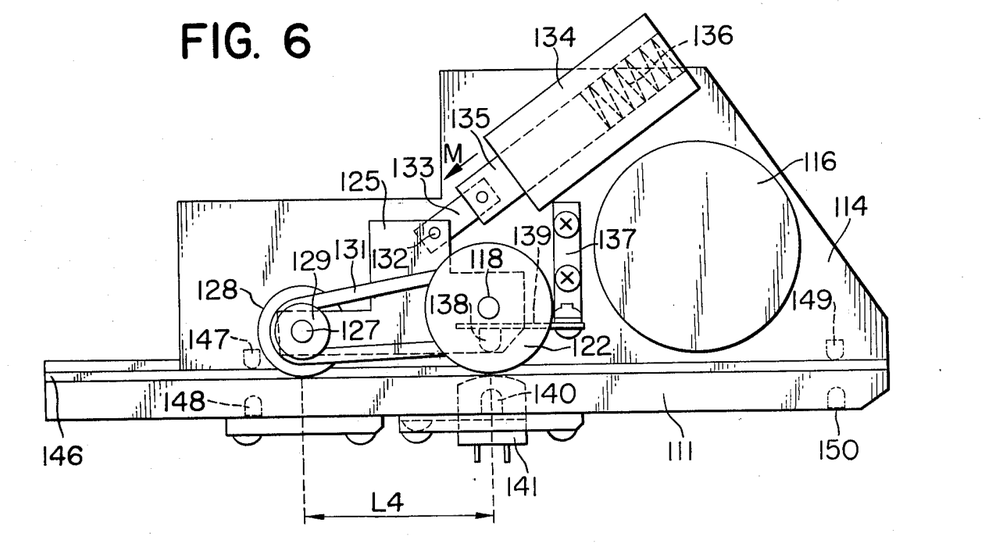
FIG. 6 is a side view taken along line A—A' in FIG. 5.
Figure 7:
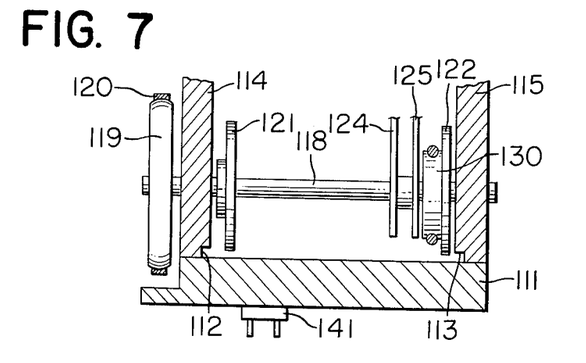
FIG. 7 is a front view of essential portions taken along line B—B' in FIG. 5.
Figure 8:
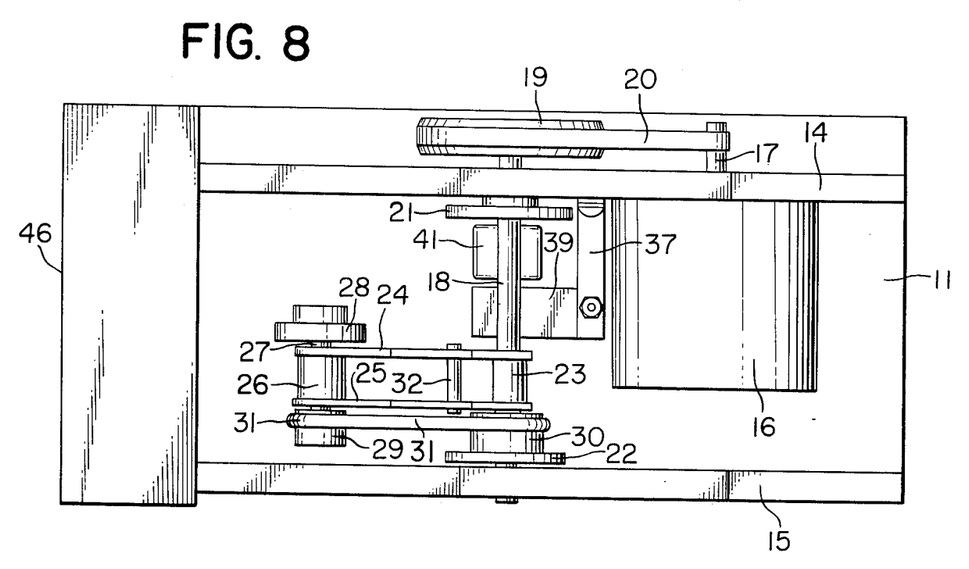
FIG. 8 is a top plan view of the card conveyor device with the solenoid and plunger removed therefrom.

FIG. 5 is a top plan view of the card conveyor device according to the present invention, FIG. 6 is a side view taken along line A—A' in FIG. 5, and FIG. 7 is a front view of essential portions taken along line B—B' in FIG. 5. Designated by 111 is a base plate which provides the foundation of the card conveyor device and which has secured thereto side plates 114 and 115 provided with cut-aways 112 and 113 for guiding the card, as shown in FIG. 7, the side plates being substantially perpendicular to the base plate and parallel to each other.

A motor 116 is secured to the side plate 114 with the rotary shaft 117 of the motor extending through an unshown aperture to the other surface of the side plate 114. A rotatable shaft 118 extends substantially perpendicularly to the side plates 114 and 115 and is rotatably journalled to these side plates. A pulley 119 is securely mounted on a portion of the rotatable shaft 118 which extends outwardly of the side plate 114, and a belt 120 is passed between and over the pulley 119 and the rotary shaft 117 to transmit the rotative drive of the motor 116 to the rotatable shaft 118.

On the rotatable shaft 118 and between the side plates 114 and 115, card driving rollers 121 and 122 formed of rubber or like material are securely mounted to provide a set of second transport rollers, the diameter of which is selected such that the distance between the lower end of the rollers 121, 122 and the top surface of the base plate 111 is somewhat less than the thickness of the magnetic card.

A cylindrical member 123 is rotatably inserted over the rotatable shaft 118, and two similarly configured side plates 124 and 125 are secured to the opposite sides of the cylindrical member 123. Another cylindrical member 126 is secured to the side plates 124, 125 between their ends.

A shaft 127 is rotatably inserted in the cylindrical member 126. A card driving roller 128 is securely mounted on one end of the shaft 127 and a pulley 129 is securely mounted on the other end of the shaft. The diameter of the pulley 129 is smaller than that of the roller 128 so that the pulley 129 makes no contact with the card.

A further pulley 130 is securely mounted on the shaft 118, and a belt 131 extends between and over the two pulleys 130 and 129. Thus, as the motor 116 is driven, the pulley 119 is driven through the agency of the rotary shaft 117 and the belt 120 to thereby rotate the rotatable shaft 118 and accordingly the rollers 121 and 122 and the pulley 130, so that the roller 128 is rotated through the agency of the belt 131, the pulley 129 and the shaft 127.

The diameters of the pulleys 130 and 129 and the diameters of the second transport rollers 121, 122 and the first transport roller 128 are selected such that the peripheral speed of the rollers 121, 122 is equal to that of the roller 128, but in the card conveyor device to which the present invention is applied, the peripheral speed of the roller 128, for example, may be set to about twice that of the rollers 121, 122 for a reason which will hereinafter be set forth.

A shaft 132 is secured between the side plates 124 and 125 and has a driving plate 133 rotatably mounted thereon. Rotatably mounted on the other end of the driving plate 133 is one end of a plunger 135 movable within a solenoid 134 secured to the inside of the side plate 115.

The plunger 135 at the one end thereof is normally biased in the direction of arrow M by a spring 136 so that the first transport roller 128 is normally urged toward the base plate 111 and about the rotatable shaft 118.

An L-shaped holder 137 is secured to the inside of the side plate 114, and a mounting plate 139 having a light-emitting diode 138 secured thereto is fixed to a portion of the holder plate 137.

The light-emitting diode 138 is disposed such that it is located on a perpendicular from the center axis of the rollers 121, 122 onto the base plate 111 and located above the straight line passing through the cut-aways 112 and 113 in FIG. 7.

A through-aperture (not shown) is formed at that point on the base plate 111 which corresponds to said perpendicular, and a light-sensing element 140 is provided at the bottom of the through-aperture. The light-emitting diode 138 and the light-sensing element 140 together constitute a third sensor. (A first and a second sensor will later be described).

Thus, when the card is transported to traverse the through-aperture and intercept the light from the light-emitting diode 138, no output is provided from the light-sensing element and in this manner, whether or not the card has arrived at the through-aperture can be detected by the output of the light-sensing element.

Designated by 141 is a magnetic head which is fixed in such a manner that the slide surface thereof having a magnetic gap is substantially coincident with the upper surface of the base plate 111 through the aperture formed in the base plate and that the magnetic gap lies on the aforementioned perpendicular.

Therefore, as will be described below, by making such a design that as soon as the light-sensing element 140 detects the arrival of the card, the solenoid 134 is energized to drive the plunger 135 in the direction opposite to the direction of arrow M and thereby drive the side plates 124 and 125 clockwise about the rotatable shaft 118, as viewed in FIG. 6, the first transport roller 128 may be disengaged from the card.

Likewise, as shown in FIG. 6, a set of light-emitting diode 147 and light-sensing element 148 together forming the first sensor is mounted in the neighborhood of the card inlet port and short of the first transport roller 128 and a further set of light-emitting diode 149 and light-sensing element 150 together forming the second sensor is mounted at the right end of the base plate 111. These are mounted just in the same manner as the previously described light-emitting diode 138 and light-sensing element 140.

In the card reader shown in FIGS. 5 to 8, the card inlet port is designated by 146. When a card is inserted through this inlet port, the insertion is detected by the first sensor comprising the light-emitting diode 147 and the light-sensing element 148 to start the motor 116 to move the card rightwardly in FIG. 5. As soon as the leading end edge of the card arrives at the right end of the base plate 111, such arrival is detected by the second sensor comprising the light-emitting diode 149 and the light-sensing element 150 located there, whereby the revolution of the motor 116 is reversed to move the card backwardly or leftwardly, in FIG. 5, for discharge through the inlet port.

Figure 9:
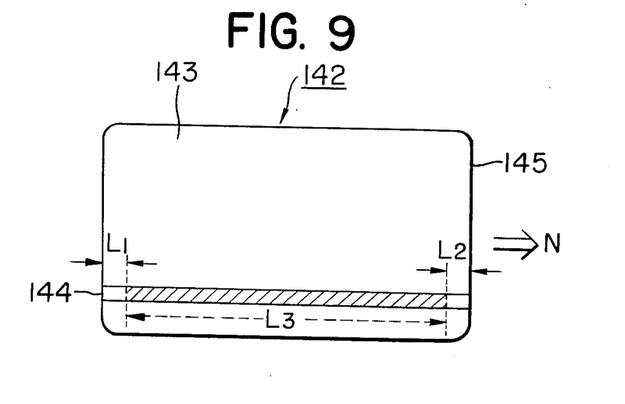
FIG. 9 is a top plan view of the magnetic card.

The card 142, as shown in FIG. 9, usually comprises a rectangular substrate 143 of plastics or like material partly formed with a track 144, which includes the opposite end areas L1 and L2 and an intermediate area L3 which is the information recording zone. (It is to be understood that the card is to be inserted into the card reader in the direction of arrow N.) In the above-described construction of the present invention, the distance between the set of second transport rollers 121, 122 and the card driving roller 128 may be smaller than L1 + L3.

Thus, the card 142 is inserted through the inlet port of the card reader and transported by the roller 128 and as soon as the leading end 145 of the card is nipped between the rollers 121 and 122, the roller 128 is lifted by the plunger 135 driven by the output of the light-sensing element 140 and thereafter, the card 142 is driven by the rollers 121 and 122.

As clearly seen in FIG. 9, the non-recording zone extends over the length L2 on the track 144 and thus, the information recording zone comes to correspond to the magnetic head after lapse of a very short time after the card has begun to be driven only by the rollers 121 and 122 (during such time, the disturbance in the constant movement of the card resulting from the disengagement of the first transport roller 128 from the card 142 disappears).

Conversely, when the card is to be discharged, the card is conveyed toward the inlet port only by the second transport rollers 121 and 122 and as soon as the end edge 145 of the card passes between the second transport rollers 121 and 122, the light-sensing element 140 of the third sensor again begins the light sensing to thereby deenergize the solenoid 135, which thus permits the plunger 135 to be biased by the spring 136 in the direction of arrow M, thereby urging the roller 128 into contact with the card 142. During such contact, the information recording zone is already out of contact with the magnetic head and free of any influence which would be imparted thereto if they were in contact.

In the construction described hitherto, the magnetic card is conveyed by the first and second transport rollers but in spite of this, at the point of time whereat the magnetic card so far conveyed by the first transport roller becomes ready to be conveyed by the second roller, the rotative engagement of the first transport roller with the magnetic card is released so that, unlike the prior art, no variation in velocity occurs when the magnetic card leaves the first transport roller, and accordingly, highly stable card transport can be accomplished.

Thus, the present invention can provide a compact and highly reliable card conveyor device.

The foregoing embodiment has been described with respect to a card for withdrawing money from a bank deposit, whereas the present invention may very effectively be applied to the card conveyor portion in a card reader for checking up the registration numbers of magnetic credit cards or in a card reader for ordinary deposit cards of the type which contain all types of necessary information such as deposit balance, amount of deposit, etc.

What is claimed is:

1. A card conveyor device comprising:
   a card guide path along which a card for reading or writing information therein is guided in a predetermined direction;
   an inlet-outlet port for inserting therethrough said card into said card guide path and for discharging therethrough said card from said card guide path;
   first and second card transport means disposed successively along said card guide path in the direction from said inlet-outlet port;
   first detector means for detecting that said card has been inserted into said card guide path through said inlet-outlet port and that said card has been discharged from said card guide path;
   second detector means for detecting that said card, after its forward movement from said inlet-outlet port toward said card guide path, has reached a predetermined position on said card guide path;
   third detector means for detecting the position of said card on said card guide path between said first and said second detector means;
   control means for bringing said first card transport means into or out of engagement with said card in accordance with an output from said third detector means; and
   drive means for driving said first and second card transport means forwarly in response to a signal from said first detector means and for reversing the forward drive of said first and second card transport means in response to a signal from said second detector means.

2. A card conveyor device according to claim 1, wherein said control means comprises release means for releasing the engagement of said first card transport means with said card in response to a card detection signal produced by said third detector means upon detection of the presence of said card at a position opposed to said third detector means.

3. The card conveying device as claimed in claim 1, wherein said control means further comprises contact means to cause said first card forwarding means to contact said card by receiving a non-detection signal of the card to be generated from said third detector means as the result of detection of the absence of said card from a position opposite to said third detector means.

4. A card conveyor device according to claim 2, wherein said control means further comprises engage means for bringing said first card transport means into engagement with said card in response to a card non-detection signal produced by said third detector means upon detection of the absence of said card at the position opposed to said third detector means.

5. The card conveying device as claimed in claim 4, wherein said first detection means is disposed on said card guide path at a position to the side of said insertion and discharge opening relative to said first card forwarding means.

6. The card conveying device as claimed in claim 5, wherein said third detector means is disposed on said card guide path at a position opposite to said insertion and discharge opening relative to said card forwarding means and in the vicinity of said second card forwarding means.

7. A card conveyor device according to claim 1, wherein said first detector means is located on said card guide path toward said inlet-outlet port with respect to said first card transport means.

8. A card conveyor device according to claim 1, wherein said third detector means is located on said card guide path adjacent to said second card transport means and remotely from said inlet-outlet port with respect to said second card transport means.

9. A card conveyor device comprising:
   a card guide path along which a card for reading or writing information therein is guided in a predetermined direction;
   an inlet-outlet port for inserting therethrough said card into said card guide path and for discharging therethrough said card from said card guide path;
   a first and a second card transport roller disposed successively along said card guide path in the direction from said inlet-outlet port;
   first detector means disposed on said card guide path toward said inlet-outlet port with respect to said first card transport roller for detecting that said card has been inserted into said card guide path through said inlet-outlet port and that said card has been discharged from said card guide path;
   second detector means for detecting that said card, after its forward movement from said inlet-outlet port toward said card guide path, has reached a predetermined position on said card guide path;
   third detector means for detecting the position of said card located on said card guide path between said first and said second detector means and adjacent to said second card transport roller but on the opposite side thereof from said inlet-outlet port;
   drive means for driving said first and second card transport rollers forwardly in response to a signal from said first detector means and for reversing the forward drive of said first and second card transport rollers in response to a signal from said second detector means;
   release means for releasing the engagement of said first card transport roller with said card in response to a card detection signal produced by said third detector means upon detection of the presence of said card at a position opposed to said third detector means;
   engage means for bringing said first card transport roller into engagement with said card in response to a card non-detection signal produced by said third detector means upon detection of the absence of said card at the position opposed to said third detector means; and a magnetic head for reading or writing information in said card.

10. A card conveyor device according to claim 9, wherein said magnetic head is located on said card guide path toward the end of forward stroke of said card with respect to said second card transport roller and arranged in such a manner that the distance between the gap portion of said magnetic head and said second detector means is longer than at least the information recording zone of said card.

11. A card conveyor device according to claim 9, wherein said first detector means further includes instructing means for detecting, during backward movement of said card toward said inlet-outlet port, the arrival of the then leading end edge of said card to instruct said drive means to stop its drive.

12. A card conveyor device comprising:
a card guide path along which a card for reading or writing information therein is guided in a predetermined direction;
an inlet-outlet port for inserting therethrough said card into said card guide path and for discharging therethrough said card from said card guide path;
first and second card transport rollers comprising:
a first rotatable shaft extending substantially perpendicularly to side plates of said card conveyor device and rotatably secured to said side plates;
a card conveyor roller of rubber or like material for said second card transport roller securely mounted on said first rotatable shaft;
a card driving roller for said first card transport roller;
a second rotatable shaft securely mounted on said card driving roller for said first card transport roller to rotate the same;
a connector member for connecting together said first and second rotatable shaft so that said second rotatable shaft is rotatable with respect to said first rotatable shaft;
first detector means disposed on said card guide path toward said inlet-outlet port with respect to said first card transport roller for detecting that said card has been inserted into said card guide path through said inlet-outlet port and that said card has been discharged from said card guide path;
second detector means for detecting that said card, after its forward movement from said inlet-outlet port toward said card guide path, has reached a predetermined position on said card guide path;
third detector means for detecting the position of said card located on said card guide path between said first and said second detector means and adjacent to said second card transport roller but on the opposite side thereof from said inlet-outlet port;
a motor for forwardly rotating said first and second card transport rollers in response to a signal from said first detector means and for reversing the forward rotation of said first and second card transport rollers in response to a signal from said second detector means;
release means for releasing the engagement of said first card transport roller with said card in response to a card detection signal produced by said third detector means upon detection of the presence of said card at a position opposed to said third detector means;
engage means for bringing said first card transport roller into engagement with said card in response to a card non-detection signal produced by said third detector means upon detection of the absence of said card at the position opposed to said third detector means; and
a magnetic head for reading or writing information in said card located on said card guide path toward the end of forward stroke of said card with respect to said second card transport roller and arranged in such a manner that the distance between the gap portion of said magnetic head and said second detector means is longer than at least the information recording zone of said card.

13. A card conveyor device according to claim 12, wherein said release means and said engage means comprise:
a shaft secured to said connector member;
a driving plate having one end thereof pivotally mounted on said shaft;
a plunger secured to the other end of said driving plate;
a spring for biasing said plunger so as to normally urge said connector member toward said card guide path about said first rotatable shaft; and
a solenoid including therewithin said plunger and said spring, said plunger being slidable within said solenoid, said solenoid being operable in response to the detection signal from said third detector means.

14. A card conveyor device according to claim 12, wherein each of said first, said second and said third detector means comprises a light-emitting diode and an associated light-sensing element.

15. The card conveying device as claimed in claim 13, wherein each of said first, second, and third detector means comprise a light emitting diode and a light receiving element therefor.

16. A card conveying device comprising in combination:
a. a card guide path having a certain definite length, and for leading a card provided therein, and having an information zone in the lengthwise direction thereof, in a predetermined direction;
b. an opening provided at one end of said card guide path;
c. first card forwarding means provided at one portion of said card guide path, and to transfer said card;
d. second card forwarding means provided on said card guide path to transfer said card, said second card forwarding means being disposed at a position opposite to said opening relative to said first card forwarding means, and being a shorter distance from said first card forwarding means than the length of said card;
e. drive and stop means to effect transfer and stoppage of transfer of said card by said first card forwarding means by releasing the contact between said first card forwarding means and said card when said card which has been transported to the second card forwarding means by said first card forwarding means begins to be transferred by said second card forwarding means; and
f. information converting means to read-out or write-in information from or into said information zone on said card which is being transferred on said card guide path by said second card forwarding means alone, while the driving of the card by said first card forwarding means is stopped by said drive and stop means.

17. The card conveying device as claimed in claim 16, further comprising:
a first detection means to detect the presence of a card between said opening and said first card forwarding means; and
drive means to said first card forwarding means and said second card forwarding means by a card detection output from said first detection means in such a manner that said card may move from said first card forwarding means to said second card forwarding means on and along said card guide path.

18. The card conveying device as claimed in claim 16, further comprising:
a second detection means disposed at a position opposite to said opening relative to said second card forwarding means, the distance between said second card forwarding means and said second detection means being less than the length of said card; and
drive means said first card forwarding means and said second card forwarding means by a card detection output from said second detection means in such a manner that said card may move from said second card forwarding means to said first card forwarding means on and along said card guide path.

19. The card conveying device as claimed in claim 15, wherein said first card forwarding means comprises a first roller and a second shaft as its center axis of rotation, and said second card forwarding means comprises a second roller and a first shaft as its center axis of rotation, said both first and second shafts being connected by a connecting member.

20. The card conveying device as claimed in claim 15, wherein said drive and stop means comprises third detection means to detect that said card is at a position corresponding to said second card forwarding means, and control means to cause said first card forwarding means to contact said card, or to cause said first card forwarding means to release its contact from said card, as determined by an output from said third detection means.

21. The card conveying device as claimed in claim 20, wherein said control means comprise release means to release the contact of said first card forwarding means to said card by detection of the presence of said card at a position opposite to said third detection means.

22. The card conveying device as claimed in claim 20, wherein said control means comprise contacting means to cause said first card forwarding means to contact said card by detection of the absence of said card from a position opposite to said third detection means.

23. The card conveying device as claimed in claim 21, wherein said control means further comprise contacting means to cause said first card forwarding means to contact said card by detection of the absence of said card from a position opposite to said third detection means.

24. A card conveying device comprising in combination:
a. a card guide path having a certain definite length, and for leading a card provided thereon, and having an information zone in the lengthwise direction thereof, in a predetermined direction;
b. an opening provided at one end part of said card guide path;
c. a first card transfer roller positioned at one portion of said card guide path and having a second shaft as its center axis of rotation;
d. a second card transfer roller positioned along said guide path at a position opposite to said opening relative to said first roller, and having a first shaft as its center axis of rotation the distance between said first roller and said second roller being less than the length of said card;
e. means mounting both said first and second shafts in a freely rotatable manner;
f. drive and stop means to effect transfer and stoppage of transfer of the card by the first roller by releasing the contact between said first roller and said card when said card which has been transferred to the side of said second roller by said first roller begins to be transferred by said second roller; and
g. information converting means to read-out or write-in information from or into said information zone on said card which is being transferred on said card guide path by said second roller alone, while the driving of said card by said first roller is stopped by said drive and stop means.

25. The card conveying device as claimed in claim 24, further comprising:
a first detection means to detect the presence of a card provided between said opening and said first roller; and
drive means to drive said first roller and said second roller by a card detection output from said first detection means in such a manner that said card may move from said first roller to said second roller on and along said card guide path.

26. The card conveying device as claimed in claim 24, further comprising:
second detection means disposed at a position opposite to said opening relative to said second roller, the distance between said second roller and said second detection means being less than the length of said card; and
drive means to drive said first roller and second roller by a card detection output from said second detection means in such a manner that said card may move from said second roller to said first roller on and along said card guide path.

27. The card conveying device as claimed in claim 24, wherein said drive and stop means comprise third detection means to detect said card at a position corresponding to said second roller, and control means to cause said first roller to contact said card, or to cause said first roller to release its contact from said card, as determined by an output from said third detection means.

28. The card conveying device as claimed in claim 27, wherein said control means comprise release means to release the contact of said first roller to said card by detection of the presence of said card at a position opposite to said third detection means.

29. The card conveying device as claimed in claim 27, wherein said control means comprise contacting means to cause said first roller to contact said card by detection of the absence of said card from a position opposite to said third detection means.

30. The card conveying device as claimed in claim 28, wherein said control means further comprise contacting means to cause said first roller to contact said card by detection of the absence of said card from a position opposite to said third detection means.

31. A card conveying device comprising in combination:
   a. a card guide path having a certain definite length, and for leading a card provided thereon, and having an information zone in the lengthwise direction thereof, in a predetermined direction;
   b. an opening provided at one end part of said card guide path;
   c. first card forwarding means provided at one portion of said card guide path, and to transfer said card;
   d. second card forwarding means provided on said card guide path to transfer said card, said second card forwarding means being disposed at a position opposite to said opening relative to said first card forwarding means, and being spaced from said first card forwarding means by a distance less than the length of said card;
   e. transmission means provided between said first card forwarding means and said second card forwarding means to interlock said first card forwarding means with said second card forwarding means;
   f. drive and stop means to effect transfer and stoppage of transfer of said card by said first card forwarding means by releasing the contact between said first card forwarding means and said card when the card which has been transferred to the side of the second card forwarding means by said first card forwarding means begins to be transferred by said second card forwarding means; and
   g. information converting means to read-out or write-in informations from or into said information zone on said card which is being transferred on said card guide path by said second card forwarding means alone, while the driving of said card by said first card forwarding means is stopped by said driving and stopping means.

32. The card conveying device as claimed in claim 31, further comprising:
   first detection means provided between said opening and first card forwarding means to detect the presence of said card; and
   drive means to drive said first card forwarding means and said second card forwarding means by a card detection output from said detection means in such a manner that said card may move from said first card forwarding means to said second card forwarding means on and along said card guide path.

33. The card conveying device as claimed in claim 31, further comprising:
   second detection means disposed at a position opposite to said opening relative to said second card forwarding means, the distance thereof from said second card forwarding means being less than the length of said card; and
   drive means to drive said first card forwarding means and said second card forwarding means by a card detection output from said second detection means in such a manner that said card may move from the second card forwarding means to the first card forwarding means on and along said card guide path.

34. The card conveying device as claimed in claim 31, wherein said transmission means consists of a belt.

35. The card conveying device as claimed in claim 31, wherein said first card forwarding means comprises a first roller with a second shaft as its center axis of rotation, said second card forwarding means comprises a second roller with a first shaft as its center axis of rotation, and a connecting member connects said first and second shafts.

36. The card conveying device as claimed in claim 31, wherein said drive and stop means comprises third detection means to detect said card at a position corresponding to said second card forwarding means, and control means to cause said first card forwarding means to contact said card, or to cause said first card forwarding means to release its contact from said card, as determined by an output from said third detection means.

37. The card conveying device as claimed in claim 36, wherein said control means comprise release means to release the contact of said first card forwarding means from said card by detection of the presence of said card at a position opposite to said third detection means.

38. The card conveying device as claimed in claim 36, wherein said control means comprise contact means to cause said first card forwarding means to contact said card by detection of the absence of said card from a position opposite to said third detection means.

39. The card conveying device as claimed in claim 37, wherein said control means further comprise contact means to cause said first card forwarding means to contact said card by detection of the absence of said card from a position opposite to said third detection means.

40. A card conveying device comprising in combination:
   a. a card guide path having a certain definite length, and for leading a card provided thereon, and having an information zone in the lengthwise direction thereof, in a predetermined direction;
   b. an opening provided at one end of said card guide path;
   c. first card forwarding means provided at one portion of said card guide path, and to transfer said card;
   d. second card forwarding means provided on said card guide path to transfer said card, said second card forwarding means being disposed at a position opposite to said opening relative to said first card forwarding means, and being spaced a shorter distance from said first card forwarding means than the length of said card;
   e. detection means to detect that said card is at a position corresponding to said second card forwarding means, when said card which has been transferred to said second card forwarding means by said first card forwarding means begins to be transferred by said second card forwarding means;
   f. drive and stop means to effect driving and stopping of the card transfer by said first card forwarding means by causing said first card forwarding means to contact said card, or to casue said first card forwarding means to release from its contact with said card in accordance with an output from said detection means; and
   g. information converting means to read-out or write-in information from or into said information zone on said card which is being transferred on said card guide path by said second card forwarding means alone, while the driving of said card by said first card forwarding means is stopped by said drive and stop means.

41. The card conveying device as claimed in claim 40, further comprising:
   first sensing means provided between said opening and first card forwarding means to sense the presence of said card; and
   drive means to drive said first card forwarding means and said second card forwarding means by a card sensing output of said first sensing means in such a manner that said card may move from said first card forwarding means to said second card forwarding means on and along said card guide path.

42. The card conveying device as claimed in claim 40, further comprising:
   second sensing means disposed at a position opposite to said opening relative to said second card forwarding means, the distance thereof from said second card forwarding means being less than the length of said card; and
   drive means to drive said first card forwarding means and said second card forwarding means by a card sensing output from said second sensing means in such a manner that said card may move from the side of the second card forwarding means to the side of said first card forwarding means on and along said card guide path.

43. A card conveying device comprising in combination:
   a. a card guide path having a certain definite length, and for leading a card provided thereon, and having an information zone in the lengthwise direction thereof, in a predetermined direction;
   b. an opening provided at one end part of said card guide path;
   c. first card forwarding means provided on one portion of said card guide path, and to transfer said card;
   d. second card forwarding means provided on said card guide path to transfer said card, said second card forwarding means being disposed at a position opposite to said opening relative to said first card forwarding means, and being a shorter distance from said first card forwarding means than the length of said card;
   e. a connecting member to dispose said first card forwarding means and said second card forwarding means in a freely rotatable manner;
   f. detection means to detect that said card is at a position corresponding to said second card forwarding means when said card which has been transferred to said second card forwarding means by said first card forwarding means begins to be transferred by said second card forwarding means;
   g. a plunger to effect driving and stopping of the card transfer by said first card forwarding means by rotating said first card forwarding means with said second card forwarding means as the center of rotation to cause said first card forwarding means to contact said card, or to cause said first card forwarding means to release its contact with said card as determined by an output from said detection means; and
   h. information converting means to read-out or write-in informations from and into said information zone on said card which is being transferred on said card guide path by said second card forwarding means alone, while the driving of said card by said first card forwarding means is stopped by said plunger.

44. The card conveying device as claimed in claim 43, further comprising:
   first sensing means provided between said opening and first card forwarding means to sense the presence of said card; and
   drive means to transfer said first card forwarding means and said second card forwarding means by a card sensing output of said first sensing means in such a manner that said card may move from the side of said first card forwarding means to the side of said second card forwarding means on and along said card guide path.

45. The card conveying device as claimed in claim 43, further comprising:
   second sensing means disposed at a position opposite to said opening relative to said second card forwarding means, the distance thereof from said second card forwarding means being less than the length of said card; and
   drive means to drive said first card forwarding means and said second card forwarding means by a card sensing output from said second sensing means in such a manner that said card may move from said second card forwarding means to said first card forwarding means on and along said card guide path.

46. The card conveying device as claimed in claim 43, wherein said first card forwarding means comprises a first roller with a second shaft as its center axis of rotation, and said second card forwarding means comprises a second roller with a first shaft as its center axis of rotation, both said first and second shafts being connected by said connecting member.

47. A card conveying device comprising in combination:
   a. a card guide path having a certain definite length, and for leading a card provided thereon, and having an information zone in the lengthwise direction thereof, in a predetermined direction;
   b. an opening provided on one end part of said card guide path;
   c. first card forwarding means provided on one portion of said card guide path, and to transfer said card;
   d. second card forwarding means provided on said card guide path to transfer said card, said second card forwarding means being disposed at a position opposite to said opening relative to said first card forwarding means, and being a shorter distance from said first card forwarding means than the length of said card;
   e. drive and stop means to effect transfer and stoppage of the card transfer by said first card forwarding means by releasing the contact between said first card forwarding means and said card, when said card which has been transferred to said second card forwarding means by said first card forwarding means begins to be transferred by said second card forwarding means; and
   f. a magnetic head to read-out or write-in informations from or into said information zone on said card which is being transferred on said card guide path by said second card forwarding means alone, while the driving of said card by said first card forwarding means is stopped by said drive and stop means.

48. The card conveying device as claimed in claim 47, wherein said magnetic head is disposed on said card guide path at a position corresponding to said second card forwarding means.

49. The card conveying device as claimed in claim 47, further comprising:
first detection means provided between said opening and first card forwarding means to detect the presence of said card; and
drive means to drive said first card forwarding means and said second card forwarding means by a card detection output from said first detection means in such a manner that said card may move from said first card forwarding means to said second card forwarding means on and along said card guide path.

50. The card conveying device as claimed in claim 47, further comprising:
second detection means disposed at a position opposite to said opening relative to said second card forwarding means, the distance thereof from said second card forwarding means being less than the length of said card; and
drive means to drive said first card forwarding means and said second card forwarding means by a card detection output from said second detection means in such a manner that said card may move from said second card forwarding means to said first card forwarding means on and along said card guide path.

51. The card conveying device as claimed in claim 47, wherein said first card forwarding means comprises a first roller with a second shaft as its center axis for rotation, and said second card forwarding means comprises a second roller with a first shaft as its center axis for rotation, both said first and second shafts being connected by a connecting member.

52. The card conveying device as claimed in claim 47, wherein said drive and stop means comprises detection means to detect said card at a position corresponding to said second card forwarding means, and control means to cause said first card forwarding means to contact said card, or to cause said first card forwarding means to release its contact with said card, as determined by an output from said detection means.

53. The card conveying device as claimed in claim 52, wherein said control means comprise release means to release the contact of said first card forwarding means to said card by detection of the presence of said card at a position opposite to said third detection means.

54. The card conveying device as claimed in claim 52, wherein said control means comprise contact means to cause said first card forwarding means to contact said card by detection of the absence of said card from a position opposite to said third detection means.

55. The card conveying device as claimed in claim 53, wherein said control means further comprise contact means to cause said first card forwarding means to contact said card by detection of the absence of said card from a position opposite to said third detection means.

* * * * *

UNITED STATES PATENT AND TRADEMARK OFFICE
CERTIFICATE OF CORRECTION

PATENT NO. : 4,019,025
DATED : April 19, 1977
INVENTOR(S) : TADASU TANIGUCHI, et al.

It is certified that error appears in the above-identified patent and that said Letters Patent are hereby corrected as shown below:

First page, in the Abstract, lines 2 and 3, delete "the transport means . . . . length of the card,"; line 7, after "path,", insert -- the transport means being spaced by a distance less than the length of the card, --.
Column 3, line 7, change "are" to -- and --; line 14, change "now" to -- not --; line 15, change "withdrawl" to -- withdrawal --; line 67, after "1d" insert -- ) --.
Column 6, line 11, change "solenoic" to -- solenoid --.
Column 9, line 48, change "forwarly" to -- forwardly --.
Column 12, line 65, change "information" to -- informations --.
Column 13, line 8, after "to" insert -- drive --; line 23, after "means" insert -- to drive --; line 30, change "15" to -- 16 --; line 37, change "15" to -- 16 --.
Column 14, line 22, change "information" to -- informations --.
Column 16, line 66, change "information" to -- informations --.

Signed and Sealed this

Eighth Day of November 1977

[SEAL]

Attest:

RUTH C. MASON
Attesting Officer

LUTRELLE F. PARKER
Acting Commissioner of Patents and Trademarks